United States Patent
Rozas

(10) Patent No.: US 9,411,595 B2
(45) Date of Patent: Aug. 9, 2016

(54) MULTI-THREADED TRANSACTIONAL MEMORY COHERENCE

(75) Inventor: Guillermo J. Rozas, Los Gatos, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 132 days.

(21) Appl. No.: 13/485,601

(22) Filed: May 31, 2012

(65) Prior Publication Data

US 2013/0326153 A1  Dec. 5, 2013

(51) Int. Cl.
| | |
|---|---|
| *G06F 12/00* | (2006.01) |
| *G06F 9/38* | (2006.01) |
| *G06F 9/52* | (2006.01) |
| *G06F 12/08* | (2016.01) |

(52) U.S. Cl.
CPC *G06F 9/38* (2013.01); *G06F 9/528* (2013.01); *G06F 12/0842* (2013.01); *G06F 12/0862* (2013.01); *G06F 12/0815* (2013.01); *G06F 12/0897* (2013.01); *G06F 2212/1016* (2013.01)

(58) Field of Classification Search
USPC ......... 711/100, 113, 118, 141, 144, 145, 147, 711/148, 150, 151, 152, 154, 163, E12.026
See application file for complete search history.

(56) References Cited

U.S. PATENT DOCUMENTS

| | | |
|---|---|---|
| 4,620,217 A | 10/1986 | Songer |
| 4,648,045 A | 3/1987 | Demetrescu |
| 4,700,319 A | 10/1987 | Steiner |
| 4,862,392 A | 8/1989 | Steiner |
| 4,901,224 A | 2/1990 | Ewert |
| 5,185,856 A | 2/1993 | Alcorn et al. |
| 5,268,995 A | 12/1993 | Diefendorff et al. |
| 5,285,323 A | 2/1994 | Hetherington et al. |
| 5,357,604 A | 10/1994 | San et al. |
| 5,392,393 A | 2/1995 | Deering |
| 5,487,022 A | 1/1996 | Simpson et al. |
| 5,488,687 A | 1/1996 | Rich |
| 5,491,496 A | 2/1996 | Tomiyasu |

(Continued)

FOREIGN PATENT DOCUMENTS

| | | |
|---|---|---|
| CN | 1954338 | 5/2004 |
| CN | 101091203 | 5/2004 |

(Continued)

OTHER PUBLICATIONS

"Interleaved Memory." Dec. 26, 2002. http://www.webopedia.com/TERM/I/interleaved_memory.html.

(Continued)

*Primary Examiner* — Midys Rojas

(57) ABSTRACT

The disclosure provides systems and methods for maintaining cache coherency in a multi-threaded processing environment. For each location in a data cache, a global state is maintained specifying the coherency of the cache location relative to other data caches and/or to a shared memory resource backing the data cache. For each cache location, thread state information associated with a plurality of threads is maintained. The thread state information is specified separately and in addition to the global state, and is used to individually control read and write permissions for each thread for the cache location. The thread state information is also used, for example by a cache controller, to control whether uncommitted transactions of threads relating to the cache location are to be rolled back.

20 Claims, 6 Drawing Sheets

(56) References Cited

U.S. PATENT DOCUMENTS

| | | | |
|---|---|---|---|
| 5,577,213 | A | 11/1996 | Avery et al. |
| 5,579,473 | A | 11/1996 | Schlapp et al. |
| 5,579,476 | A | 11/1996 | Cheng et al. |
| 5,581,721 | A | 12/1996 | Wada et al. |
| 5,600,584 | A | 2/1997 | Schlafly |
| 5,604,824 | A | 2/1997 | Chui et al. |
| 5,613,050 | A | 3/1997 | Hochmuth et al. |
| 5,655,132 | A | 8/1997 | Watson |
| 5,701,444 | A | 12/1997 | Baldwin |
| 5,764,228 | A | 6/1998 | Baldwin |
| 5,777,628 | A | 7/1998 | Buck-Gengler |
| 5,831,640 | A | 11/1998 | Wang et al. |
| 5,850,572 | A | 12/1998 | Dierke |
| 5,864,342 | A | 1/1999 | Kajiya et al. |
| 5,941,940 | A | 8/1999 | Prasad et al. |
| 5,995,121 | A | 11/1999 | Alcorn et al. |
| 6,166,743 | A | 12/2000 | Tanaka |
| 6,173,366 | B1 | 1/2001 | Thayer et al. |
| 6,222,550 | B1 | 4/2001 | Rosman et al. |
| 6,229,553 | B1 | 5/2001 | Duluk, Jr. et al. |
| 6,259,460 | B1 | 7/2001 | Gossett et al. |
| 6,288,730 | B1 | 9/2001 | Duluk, Jr. et al. |
| 6,333,744 | B1 | 12/2001 | Kirk et al. |
| 6,351,806 | B1 | 2/2002 | Wyland |
| 6,353,439 | B1 | 3/2002 | Lindholm et al. |
| 6,407,740 | B1 | 6/2002 | Chan |
| 6,411,130 | B1 | 6/2002 | Gater |
| 6,411,301 | B1 | 6/2002 | Parikh et al. |
| 6,417,851 | B1 | 7/2002 | Lindholm et al. |
| 6,466,222 | B1 | 10/2002 | Kao et al. |
| 6,496,537 | B1 | 12/2002 | Kranawetter et al. |
| 6,525,737 | B1 | 2/2003 | Duluk, Jr. et al. |
| 6,526,430 | B1 | 2/2003 | Hung et al. |
| 6,542,971 | B1 | 4/2003 | Reed |
| 6,557,022 | B1 | 4/2003 | Sih et al. |
| 6,597,363 | B1 | 7/2003 | Duluk, Jr. et al. |
| 6,604,188 | B1 | 8/2003 | Coon et al. |
| 6,624,818 | B1 | 9/2003 | Mantor et al. |
| 6,636,221 | B1 | 10/2003 | Morein |
| 6,664,958 | B1 | 12/2003 | Lather et al. |
| 6,717,577 | B1 | 4/2004 | Cheng et al. |
| 6,718,542 | B1 | 4/2004 | Kosche et al. |
| 6,731,288 | B2 | 5/2004 | Parsons et al. |
| 6,734,861 | B1 | 5/2004 | Van Dyke et al. |
| 6,738,870 | B2* | 5/2004 | Van Huben et al. .......... 711/150 |
| 6,778,181 | B1 | 8/2004 | Kilgariff et al. |
| 6,806,886 | B1 | 10/2004 | Zatz |
| 6,839,828 | B2 | 1/2005 | Gschwind et al. |
| 6,924,808 | B2 | 8/2005 | Kurihara et al. |
| 6,947,053 | B2 | 9/2005 | Malka et al. |
| 6,980,209 | B1 | 12/2005 | Donham et al. |
| 6,980,222 | B2 | 12/2005 | Marion et al. |
| 6,999,100 | B1 | 2/2006 | Leather et al. |
| 7,034,828 | B1 | 4/2006 | Drebin et al. |
| 7,158,141 | B2 | 1/2007 | Chung et al. |
| 7,187,383 | B2 | 3/2007 | Kent |
| 7,225,299 | B1 | 5/2007 | Rozas et al. |
| 7,257,814 | B1 | 8/2007 | Melvin et al. |
| 7,280,112 | B1 | 10/2007 | Hutchins |
| 7,298,375 | B1 | 11/2007 | Hutchins |
| 7,376,798 | B1 | 5/2008 | Rozas |
| 7,430,654 | B2 | 9/2008 | Huang et al. |
| 7,450,120 | B1 | 11/2008 | Hakura et al. |
| 7,477,260 | B1 | 1/2009 | Nordquist |
| 7,659,909 | B1 | 2/2010 | Hutchins |
| 7,710,427 | B1 | 5/2010 | Hutchins et al. |
| 7,873,793 | B1 | 1/2011 | Rozas et al. |
| 7,928,990 | B2 | 4/2011 | Jiao et al. |
| 7,941,645 | B1 | 5/2011 | Riach et al. |
| 7,969,446 | B2 | 6/2011 | Hutchins et al. |
| 8,537,168 | B1 | 9/2013 | Steiner et al. |
| 8,773,447 | B1 | 7/2014 | Donham |
| 8,860,722 | B2 | 10/2014 | Cabral et al. |
| 2002/0105519 | A1 | 8/2002 | Lindholm et al. |
| 2002/0126126 | A1 | 9/2002 | Baldwin |
| 2002/0129223 | A1 | 9/2002 | Takayama et al. |
| 2002/0169942 | A1 | 11/2002 | Sugimoto |
| 2003/0115233 | A1 | 6/2003 | Hou et al. |
| 2003/0189565 | A1 | 10/2003 | Lindholm et al. |
| 2004/0012597 | A1 | 1/2004 | Zatz et al. |
| 2004/0012599 | A1 | 1/2004 | Laws |
| 2004/0012600 | A1 | 1/2004 | Deering et al. |
| 2004/0024260 | A1 | 2/2004 | Winkler et al. |
| 2004/0100474 | A1 | 5/2004 | Demers et al. |
| 2004/0114813 | A1 | 6/2004 | Boliek et al. |
| 2004/0119710 | A1 | 6/2004 | Piazza et al. |
| 2004/0126035 | A1 | 7/2004 | Kyo |
| 2004/0130552 | A1 | 7/2004 | Duluk, Jr. et al. |
| 2004/0194084 | A1 | 9/2004 | Matsunami et al. |
| 2004/0246260 | A1 | 12/2004 | Kim et al. |
| 2005/0086644 | A1 | 4/2005 | Chkodrov et al. |
| 2005/0122330 | A1 | 6/2005 | Boyd et al. |
| 2005/0134588 | A1 | 6/2005 | Aila et al. |
| 2005/0135433 | A1 | 6/2005 | Chang et al. |
| 2005/0162436 | A1 | 7/2005 | Van Hook et al. |
| 2005/0223195 | A1 | 10/2005 | Kawaguchi |
| 2005/0231506 | A1 | 10/2005 | Simpson et al. |
| 2005/0237337 | A1 | 10/2005 | Leather et al. |
| 2005/0280655 | A1 | 12/2005 | Hutchins et al. |
| 2006/0007234 | A1 | 1/2006 | Hutchins et al. |
| 2006/0028469 | A1 | 2/2006 | Engel |
| 2006/0152519 | A1 | 7/2006 | Hutchins et al. |
| 2006/0155964 | A1 | 7/2006 | Totsuka |
| 2006/0177122 | A1 | 8/2006 | Yasue |
| 2006/0288195 | A1 | 12/2006 | Ma et al. |
| 2007/0030278 | A1 | 2/2007 | Prokopenko et al. |
| 2007/0165029 | A1 | 7/2007 | Lee et al. |
| 2007/0236495 | A1 | 10/2007 | Gruber et al. |
| 2007/0279408 | A1 | 12/2007 | Zheng et al. |
| 2007/0285427 | A1 | 12/2007 | Morein et al. |
| 2007/0288902 | A1 | 12/2007 | Lev et al. |
| 2010/0023707 | A1 | 1/2010 | Hohmuth et al. |
| 2010/0211933 | A1 | 8/2010 | Kiel et al. |
| 2012/0144126 | A1* | 6/2012 | Nimmala et al. ............. 711/141 |
| 2014/0181404 | A1 | 6/2014 | Chaudhary et al. |
| 2014/0372990 | A1 | 12/2014 | Strauss |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 05150979 A2 | 6/1993 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 5/2004 |
| WO | 2006007127 | 5/2004 |
| WO | 2005114582 | 12/2005 |
| WO | 2005114646 | 12/2005 |

OTHER PUBLICATIONS

Pirazzi, Chris. "Fields, F1/F2, Interleave, Field Dominance and More." Nov. 4, 2001. http://lurkertech.com/lg/dominance.html.

Hennessy, et al., Computer Organization and Design: The Hardware/Software Interface, 1997, Section 6.5.

Moller, et al.; Real-Time Rendering, 2nd ed., 2002, A K Peters Ltd., pp. 92-99, 2002.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

The Free Online Dictionary, Thesaurus and Encyclopedia, definition for cache; http://www.thefreedictionary.com/cache; retrieved Aug. 17, 2012.

(56) References Cited

OTHER PUBLICATIONS

Wolfe A, et al., "A Superscalar 3D graphics engine", MICRO-32. Proceedings of the 32nd annual ACM/IEEE International Symposium on Microarchitecture. Haifa, Israel, Nov. 16-18, 1999.
Zaharieva-Stoyanova E I: "Data-flow analysis in superscalar computer architecture execution," Tellecommunications in Modern Satellite, Cable and Broadcasting Services, 2003.
"Sideband," http://www.encyclopedia.com/html/s1/sideband.asp.
Pixar, Inc.; PhotoRealistic RenderMan 3.9 Shading Language Extensions; Sep. 1999.

PCT Notificaiton of Transmittal of the International Search Report and the Written Opinion of the International Searching Authority, or the Declaration. PCT/US05/17032; Applicant NVIDA Corporation; Mail Date Nov. 9, 2005.
PCT Notificaiton of Transmittal of The International Search Report or the Declaration. PCT/US05/17526; Applicant Hutchins, Edward A; Mail Date Jan. 17, 2006.
PCT Notificaiton of Transmittal of The International Search Report and The Written Opinion of the International Searching Authority, or the Declaration. PCT/US05/17031; Applicant NVIDA Corporation; Mail Date Feb. 9, 2007.

* cited by examiner

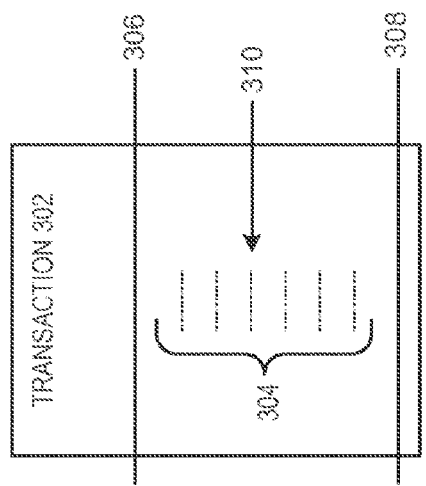
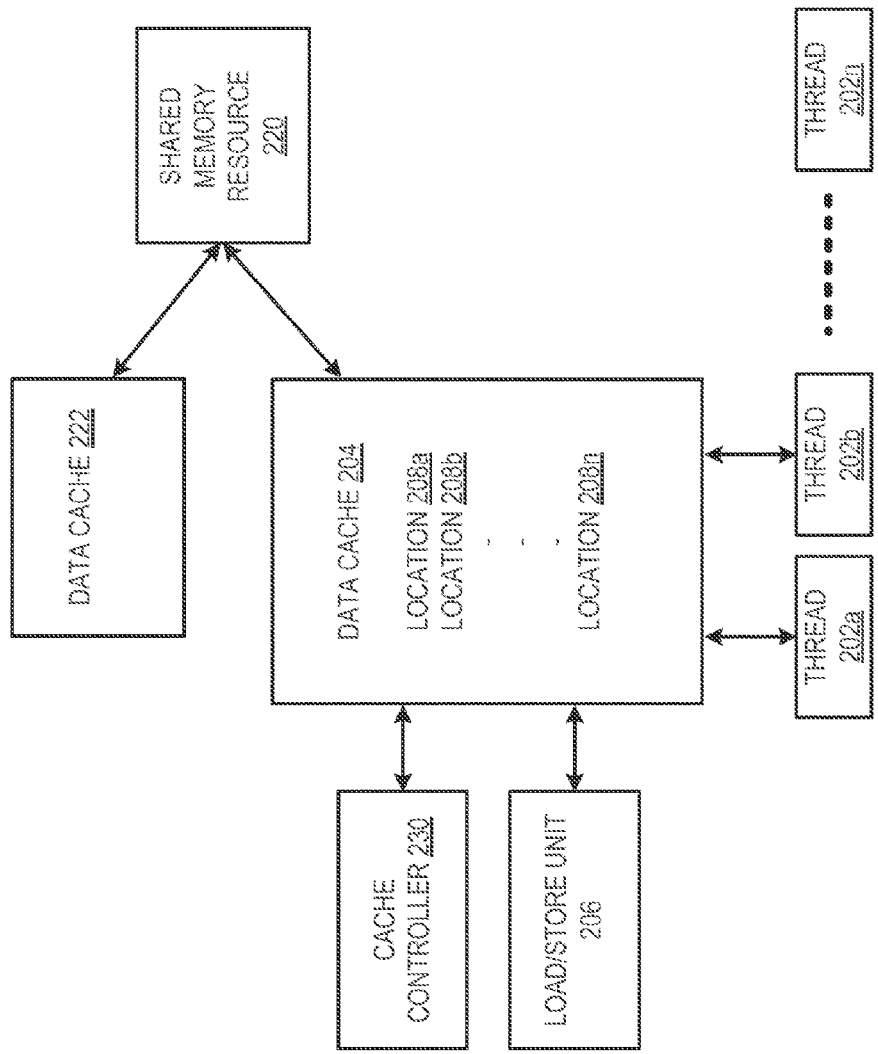

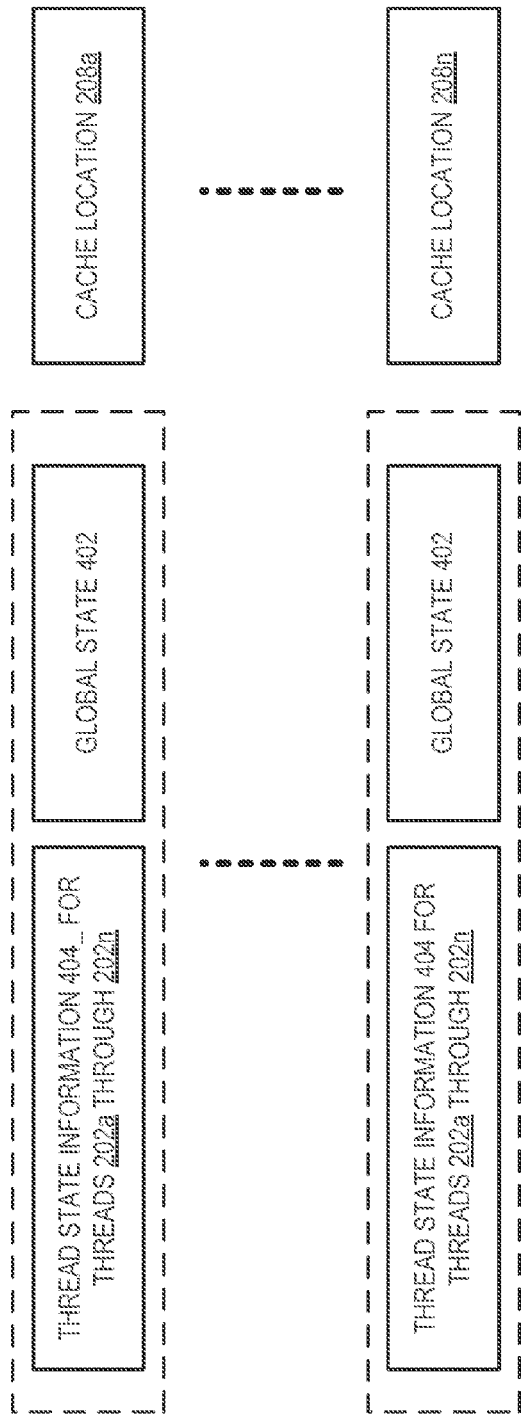

MULTI-THREADED TRANSACTIONAL MEMORY COHERENCE

BACKGROUND

Modern microprocessors may be implemented so that ISA instructions and their constituent components (e.g., micro-operations) are organized into transactions. The transactions have multiple sub-components that are executed by the processor. The individual transactions as a whole appear atomic and indivisible even if the sub-components are executed independently internally. Prior to commitment of a transaction, the sub-component operations can speculatively affect the cache subsystem (e.g., via a speculative store). Regardless of how transactional memory is handled, a multi-threaded processor increases the complexity of maintaining the coherency of the data cache because cache locations typically are shared by the processing threads. These processors must ensure that speculative data from one thread is not visible to another thread. Alternatively, if speculative data from one thread has become visible to another, a rollback on one thread requires a coordinated rollback of any other thread that has observed the speculative data.

BRIEF DESCRIPTION OF THE DRAWINGS

FIG. 2 schematically depicts an example micro-processing system with two data caches backed by a shared memory resource, and in which multiple processing threads interact with one of the data caches in cooperation with a load store unit and a data cache controller.

FIG. 3 depicts an exemplary transaction and its subcomponent operations.

FIG. 4 depicts an exemplary association of global state and thread state information with each of a plurality of cache locations in a data cache.

FIG. 5 shows an example of the global state and thread state information that may be associated with an individual cache location (e.g., a cache line) in a data cache.

DETAILED DESCRIPTION

The present disclosure is directed to a multithreaded micro-processing system in which the coherency and use of a data cache is maintained and controlled via state information associated with individual threads that read and write to locations in the data cache while carrying out transactions. Each location in the data cache (e.g., a cache line) has an associated global state. This global state specifies the coherency status of the cache location relative to a corresponding location in another data cache and/or relative to a shared memory resource backing the two caches, e.g. an L2 cache backing two different L1 caches on separate processing cores.

For example, in a MESI coherency regime, a cache location can be globally modified, exclusive, shared or invalid. In the modified state (M), the cache location is exclusive (not shared with a corresponding location in another cache) and dirty (contains data that is more recent and that is not replicated elsewhere in the memory system). Transitioning to the modified state requires invalidation of any shared cache locations on other commonly-backed cores. In the exclusive state (E), the cache location is not shared, but the data in the location is clean—i.e., duplicated in another location such as a higher level cache. As with the modified state, transitioning to exclusive involves invalidation of any shared locations on other commonly-backed cores. The shared state (S) reflects a situation in which one or more locations are valid, contain the same data, if there are multiple locations, and the data is clean, i.e., duplicated in another place in the memory system.

In the present system, the global state of each location in the cache is augmented with separate thread state information maintained for processing threads that interact with the data cache and its cache locations (e.g., cache lines). This thread state information is specified for the cache location separately from and in addition to the global state. A cache controller or other control mechanism uses this state information to individually control whether the threads may read from or write to the cache location during execution of a transaction. The thread state information may further include information about speculative activity of the individual threads, such as reads and writes that have occurred during in-flight, uncommitted transactions. The control mechanism can therefore further use the thread state information to determine and control whether uncommitted transactions of threads relating to the cache location are to be rolled back. Although the examples herein contemplate a MESI global state, it should be understood that other mechanisms and methods may be used to provide a global state without departing from the scope of the present description. Control of permissions and rollback may be performed directly by the cache controller, or in combination with other mechanisms/logic on the processor core.

Figure 1:
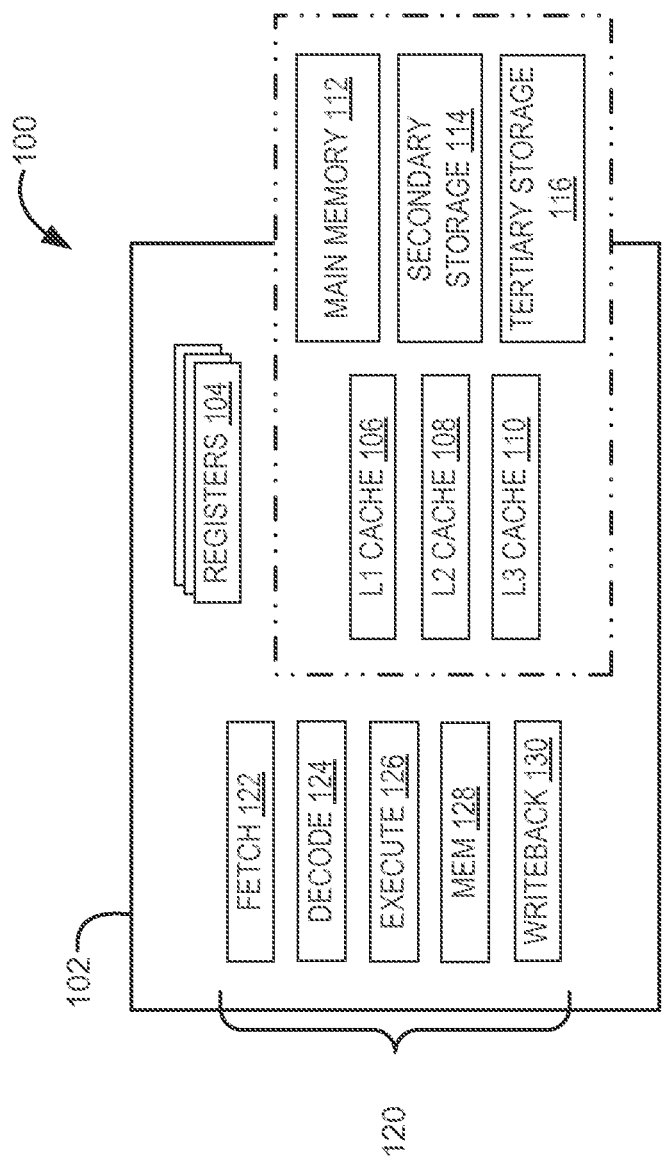
FIG. 1 schematically depicts a micro-processing system with transactional memory according to the present description.

FIG. 1 schematically depicts a microprocessor and transactional memory system 100 that may be employed in connection with the systems and methods described herein. In particular, system 100 may be implemented to provide cache coherency in an environment where multiple threads perform speculative transactions affecting locations in a data cache.

System 100 may include a microprocessor/processor core 102 that includes and/or may communicate with various memory/storage locations, which may include processor registers 104, an L1 cache 106, an L2 cache 108, an L3 cache 110, main memory 112 (e.g., one or more DRAM chips), secondary storage 114 (e.g., magnetic and/or optical storage units) and/or tertiary storage 116 (e.g., a tape farm). Some or all of these locations may be memory-mapped, though in some implementations the processor registers may be mapped differently than the other locations, or may be implemented such that they are not memory-mapped. As indicated by the dashed box, some of the memory/storage locations may be on core 102, while others are off the core. In some examples, the L1-L3 caches will all be on the die/core; in other examples only the L1 cache will be on the die/core with the other caches and memory/storage locations being off the die/core. Many different configurations are possible. It will be understood that the memory/storage components are listed above in increasing order of access time and capacity, though there are possible exceptions. Typically, some form of memory controller (not shown) will be used to handle the protocol and provide the signal interface required of main memory 112, and, typically, to schedule memory accesses. The memory controller can be implemented on the processor die or on a separate die. It is to be understood that the locations set forth above are non-limiting and that other memory/storage locations may be used without departing from the scope of this disclosure.

Microprocessor 102 may be configured to execute various instruction set architectures, which may be characterized as complex instruction sets (CISC architecture), reduced instruction sets (RISC architecture), and/or VLIW architectures. Furthermore, it is possible that a given instruction set may have characteristics associated with more than one of these regimes. In addition, some instruction sets that are thought of as CISC implementations may in fact be executed on microprocessor 102 in a RISC-like fashion. For example, the widely employed x86 architecture, though considered a CISC system, is often implemented in a manner that is more associated with a pipelined RISC implementation.

Instantiation of code as a series of processor-recognized instructions (i.e., ISA instructions) may entail compiling code of an operating system, application, driver, etc. to produce binary code that is executed by microprocessor 102. Binary code may be optimized for execution using various techniques, including VLIW-type techniques, dynamic binary translation using a software layer, etc. In some cases, software optimizations are employed so that the microprocessor can execute instructions in program order without the need for the complex hazard detection and avoidance/mitigation hardware that are present in many CISC and RISC execution pipelines.

Microprocessor 100 further includes a processing pipeline 120 which typically includes fetch logic 122, decode logic 124, execution logic 126, mem logic 128, and writeback logic 130. Fetch logic 122 retrieves instructions from one or more of the depicted memory/storage locations (but typically from either unified or dedicated L1 caches backed by L2-L3 caches and main memory).

Decode logic 124 decodes instructions, for example, by parsing opcodes, operands, and addressing modes. Upon being parsed, the instructions are then executed by execution logic 126. For operations that produce a primary result (e.g., as opposed to those that perform a branch to another location in the executing program), writeback logic 130 writes the result to an appropriate location, such as a processor register. In load/store architectures, mem logic 128 performs load and store operations, such as loading an operand from main memory into a processor register.

It should be understood that the above five stages are somewhat specific to, and included in, a typical RISC implementation. More generally, a microprocessor may include fetch, decode, and execution logic, with mem and writeback functionality being carried out by the execution logic. The present disclosure is equally applicable to these and other microprocessor implementations.

In the described examples, instructions may be fetched and executed one at a time, possibly requiring multiple clock cycles. During this time, significant parts of the data path may be unused. In addition to, or instead of, single instruction fetching, pre-fetch methods may be used to improve performance and avoid latency bottlenecks associated with read and store operations (i.e., the reading of instructions and loading such instructions into processor registers and/or execution queues). In addition, the exemplary microprocessor may be pipelined to exploit instruction level parallelism and better utilize the data path so that there are multiple instructions in different stages of execution at the same time. Still further, fetch logic 122, decode logic 124 execution logic 126 etc., typically are individually pipelined with multiple logic stages to improve performance.

As indicated above, microprocessor 102 is implemented with multiple processing threads. These processing threads can concurrently make use of pipeline 120 and processor registers 104, and can use execution mechanisms (e.g., execution logic 126) to perform transactions. The transactions include multiple operations (e.g., micro-operations), but are treated atomically in the examples herein in an all-or-none fashion. In other words, between transaction boundaries, transaction operations are speculative. Commitment of the transaction promotes the architectural state of processor registers, memory system, etc. to a committed state. Alternatively, a transaction may be rolled back for various reasons, in which case the system reverts to the committed state that existed just prior to initiation of the transaction.

FIG. 2 depicts a multi-threaded processing environment with transactional memory in more detail. The figure depicts multiple processing threads 202 operating on a processing core, such as microprocessor 102 (FIG. 1). As indicated by 202a, 202b, etc., it will be appreciated that any practicable number of threads may be executing. Processing threads 202 execute instructions (e.g., using pipeline 120 of FIG. 1), many of which will entail interacting with data cache 204. In the example of FIG. 2, the processing threads use load/store unit 206 to read from and write to cache locations 208 in data cache 204 (i.e., cache locations 208a through 208n). As used herein, "cache locations" can refer to cache lines, portions of cache lines, or any other appropriate level of granularity within a data cache.

Data cache 204 is backed by a shared memory resource 220, which also backs another data cache 222, e.g., a cache on another core. Data caches 204, 222 and shared memory resource 220 may all contain copies of the same piece of data. One example among many is a situation where a cache line in data cache 204 corresponds to a cache line in data cache 222. A coherency regime is therefore needed to maintain consistency of data and identify the coherency status of locations in the data caches.

Cache controller 230 is operatively coupled with data cache 204, and maintains and enforces state information for each cache location 208 in the data cache. As will be described in more detail below, the cache controller maintains and controls, for each location in the cache, a global state for the cache location and thread state information for each processing thread interacting with the data cache. The global state specifies the coherency of the cache location relative to shared memory resource 220 and the other off-core data cache 222. The global state may identify, for example, whether a cache line is shared with a cache line on another core, whether the cache line is exclusive to a core, whether the data in the cache line matches a corresponding copy elsewhere in the memory hierarchy, etc. As indicated above, a MESI regime may be employed for the global state, but other coherency methods may be employed without departing from the spirit of the present disclosure.

The thread state information is specified in addition to, and is maintained separately from the global state. In the examples herein, the thread state information may be used to individually control whether each of the threads can read from and write to the cache location. In addition to this permission control, the thread state information can indicate whether a thread has speculatively read from or written to the cache location. The microprocessor can then use this information about speculative thread activity to control whether uncommitted transactions are to be rolled back. For example, assume the cache control policies specify that no thread can observe (read) data that has been speculatively written by another thread. In this case, if Thread A has written to a cache line but is still in the midst of a transaction, the microprocessor would either have to roll back Thread A or wait for its transaction to commit before allowing Thread B to observe (read) the cache line.

FIG. 3 generically depicts an exemplary transaction 302 that could be executed by any of processing threads 202. Transaction 302 includes any practicable number of constituent operations 304, such as micro-operations. The transaction, however, is treated atomically by the microprocessor. In other words, committed architectural state can only exist at the boundaries of the transaction, i.e., at pre-transaction boundary 306 or at post-transaction boundary 308. In contrast, 310 designates an intermediate operation 310 of the transaction. At this point, the transaction may have completed one or more speculative reads from, or writes to, various cache locations. If the rest of the operations complete and the processor's commit logic promotes the transaction to committed, a committed architectural state occurs at post-transaction boundary 308. On the other hand, various events may result in a need to roll back the transaction from the speculative intermediate point designated at 310. In such a case, the entire transaction is unwound and the system reverts to the committed architectural state that existed just prior to the transaction beginning, i.e., at boundary 306.

FIG. 4 shows a specific example of how coherency state information may be maintained for each of cache locations 208a through 208n. For each cache location there is a global state value 402 (e.g., a MESI value). In addition to, and separate from the global state value, thread state information 404 is maintained for the cache location for multiple active processing threads that interact with the data cache. As indicated above and discussed in more detail below, it will be appreciated that thread state information will vary from cache location to cache location. Thread A might have full exclusive permission to one location, but the location may be invalid for another; it might have written to/read from some locations but not others, etc.

FIG. 5 shows a two-thread example of global state and thread state information for a single cache location. As indicated at the left, the cache location has a global state specifying coherency state of the location relative to other caches (e.g., on another core) and/or to locations in a shared backing resource. For each thread, the thread state information is encoded in four bits, each of which can assume either a YES (Y) or NO (N) value: (1) Vr indicating whether the thread is permitted to read from the cache location; (2) Vw indicating whether the thread is permitted to write to the cache location; (3) To indicating whether the thread has in fact speculatively observed (read) from the cache location; and (4) Ts indicating whether the thread has speculatively written to the cache location. To and Ts are cleared, if set, upon both commitment and rollback. Accordingly, if either is set to YES, that is an indication that the respective thread is in the midst of a transaction and has done a read and/or write to the cache location. Alternatively, if both bits are set to NO, then with respect to that cache location, the respective thread has not done any relevant speculative activity.

According to an example coherency policy, data cache controller 230 or another control mechanism maintains the following constraints on the bits:

(1) A location cannot be marked observed (To cannot be YES) by one thread if it is not marked readable (Vr=YES) by that thread—the thread must obtain the read permission before performing the read;
(2) A location cannot be marked speculative (Ts cannot be YES) by one thread if it is not marked exclusive/writable to that thread (Vw=YES)—the thread must obtain write permission before actually performing a speculative write;
(3) A location cannot be readable by a thread (Vr cannot be YES) if it is marked exclusive/writable to some other thread (Vw=YES)—this prevents threads from "seeing" the speculative data created by a thread;
(4) A location cannot be marked readable by one thread (Vr cannot be YES) if it is not in the M, E, or S global state.
(5) A location cannot be marked writable/exclusive to one thread (Vw cannot be YES) if it is not in the M or E global state.
(6) It is legal for a location to be readable by multiple threads (Vr can be YES for multiple threads).
(7) It is illegal for a line to be writable/exclusive by multiple threads (Vw cannot be YES for more than one thread).
(8) If a line is exclusive/writable to one thread (Vw=YES), it is not readable by any other thread, and hence cannot be observed by any other thread (no other thread can have Vr or To set to YES).

The constraints and invariants identified above can also be expressed in part by the table below showing permitted thread states for each global state. For simplicity and ease of understanding, only two threads are shown, but the invariants/constraints in the above example policy can be extended to any number of threads.

|    | Thread 1 | | | | Thread 2 | | | |
| --- | --- | --- | --- | --- | --- | --- | --- | --- |
| GS | Vr | Vw | To | Ts | Vr | Vw | To | Ts |
| I  | N | N | N   | N   | N | N | N   | N   |
| S  | Y | N | Y/N | N   | Y | N | Y/N | N   |
| E  | Y | N | Y/N | N   | Y | N | Y/N | N   |
|    | Y | Y | Y/N | N   | N | N | N   | N   |
|    | N | N | N   | N   | Y | Y | Y/N | N   |
| M  | Y | N | Y/N | N   | Y | N | Y/N | N   |
|    | Y | Y | Y/N | Y/N | N | N | N   | N   |
|    | N | N | N   | N   | Y | Y | Y/N | Y/N |

Figure 6:
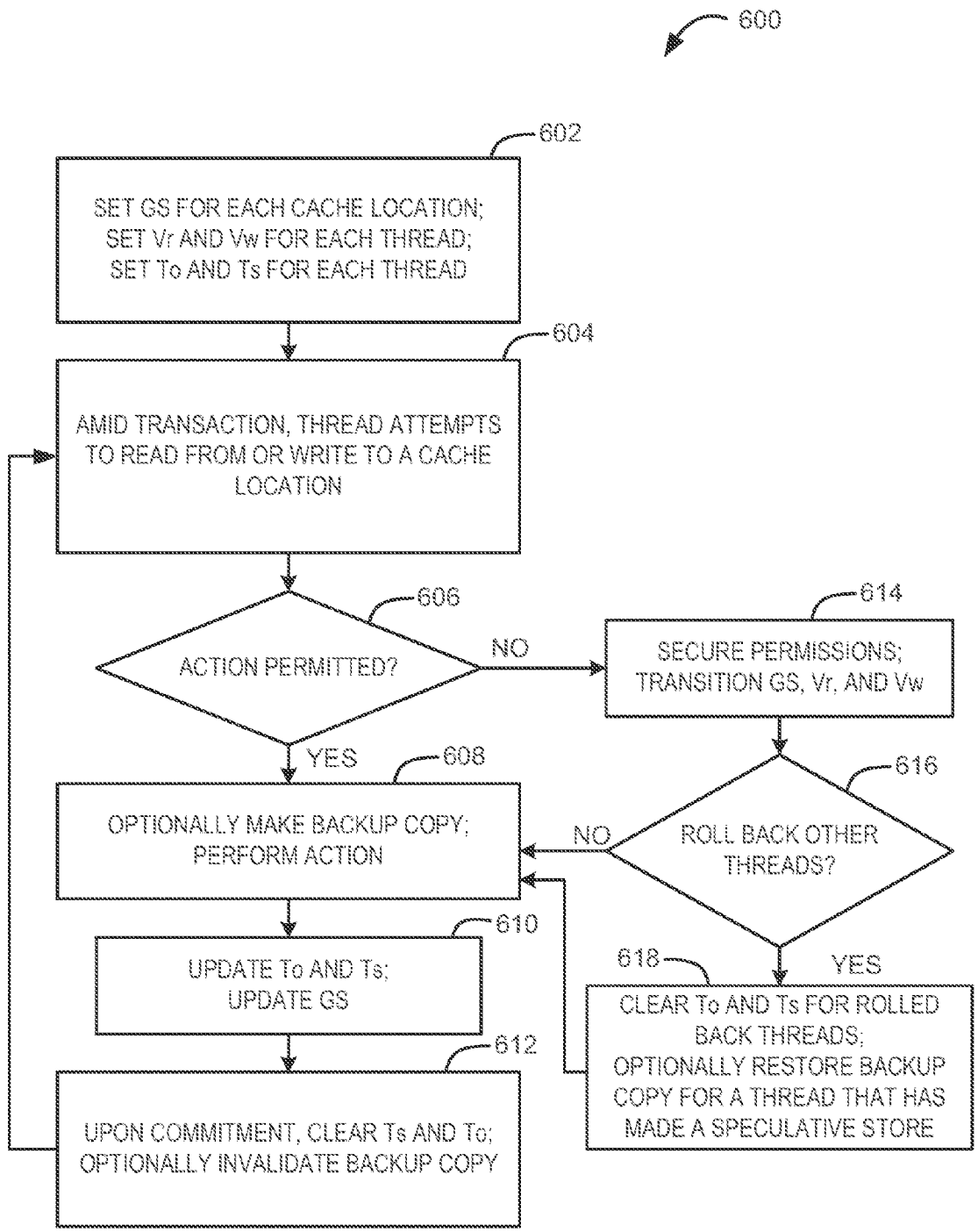
FIG. 6 shows an example method of maintaining coherency of a data cache in a multi-threaded micro-processing environment with transactional memory.

FIG. 6 is an example method 600 for maintaining coherency of a cache location in a multi-threaded processing environment. The example refers to a single cache location, but it should be understood that it is implemented for each of a plurality of locations in a data cache. At 602, method 600 includes setting/maintaining a global state (GS) for the cache location, as well as thread state information for the location. As previously described, the thread state information may include specification of read and write permissions (Vr and Vw) for each thread. The thread state information may also include, for each thread, a tracking of whether the thread has speculatively read the cache location and/or speculatively written to the cache location (To and Ts). In addition to the setting/maintaining shown in step 602, it will be appreciated that maintaining global state and thread state information for the cache location may be performed at any point in the exemplary processing flow of method 600. Still further and in general, it will be appreciated that many of the steps shown in method 600 may be performed simultaneously in parallel, and/or in sequences other than those implied by the figure. Still further, various steps may be omitted in some implementations.

At 604, the method includes a request by a particular thread to perform an action (a read or write) with respect to a cache location. At 606, the method includes determining whether the action is permitted, for example with reference to the Vr and Vw permissions discussed above. Assuming permissions are in place, the action is performed at 608. In some cases, as will be explained below, the method will include, at 608, making a backup copy of the data in the location before performing a write.

At 610, the method includes updating and tracking the global state GS, and updating the To and Ts indications of whether the location has been speculatively read or speculatively written. Regarding global state, an example update would be a transition from exclusive (E) to modified (M) if a clean cache line was overwritten with a new value during a transaction being performed by a thread. To would be set to YES if the action at 608 was the first read of a transaction being executed by the thread; Ts would be set to yes if the action at 608 was the first write of a transaction being executed by the thread. If To or Ts were already set to YES, those values would be maintained unless the transaction committed. Indeed, as shown at 612, the To and Ts bits are cleared upon commitment, to thereby indicate that the subject thread currently has performed no speculative actions with respect to the cache location. Commitment of a thread's transaction will similarly affect other cache locations that the thread has interacted with—i.e., To and Ts bits for the thread will be cleared for other cache locations. Process flow then returns to step 604, where the same thread or another thread attempts to perform another action on the cache location.

If the requested action is not permitted at 606, the situation is akin to a miss on the cache, and the cache controller or other control mechanism would proceed, at 614, to secure read and/or write permissions and make the necessary transitions with respect to global state GS, and Vr and Vw. For example, global state may need to transition from a shared to an exclusive state if a thread is requesting write access to a cache line. Depending on the type of action requested, Vr and/or Vw may be set to YES. At 616, the method includes determining whether any other threads need to be rolled back as a result of the processing at 606 and 614. Example conditions inducing rollback will be described in detail below. If no threads are rolled back, the requested action is performed at 608 and processing proceeds as previously described.

If one of the other threads is rolled back, at 618 the example method includes clearing the To and Ts bits for the rolled-back thread(s), in addition to all other actions needed to restore to the previously committed state (e.g., restoring the previously committed data to the cache location). In addition to or instead of restoring previously-committed data from a backup copy, the cache location/line can be invalidated so as to "expose" a previously invisible backup copy, or the cache line can be simply invalidated if the backup copy has been written back to a higher-level cache or memory. The setting of these bits to NO reflects the situation that the rolled-back thread now has been restored to a state where it has performed no speculative reads from or writes to the cache location. Rollback of a thread will also potentially affect other locations in the data cache (e.g., the To and Ts bits for the thread on other locations will be cleared, and previously committed data in other locations will be restored or exposed). The requested action that induced the rollback is then performed at 608, and processing proceeds as previously described. Similar to the clearing of To and Ts upon commitment, clearing of these bits for a thread reflects that the thread is now in a state where it has performed no speculative activity relating to the cache location.

Steps 608, 612 and 618 refer to a backup copy of data in the cache location. A backup copy may be needed prior to a speculative write if the cache location contains dirty committed data, because the most recently committed data is not replicated anywhere else in the memory system. Upon commitment of the transaction, the backup copy is no longer needed, and is therefore invalidated at 612. In the event of a rollback, the dirty committed data that existing prior to speculative overwriting must be restored, as shown at 618, or exposed, for example by invalidating the speculatively written location and promoting the backup copy to the current version, or writing it back to a higher cache or memory.

Figure 7:
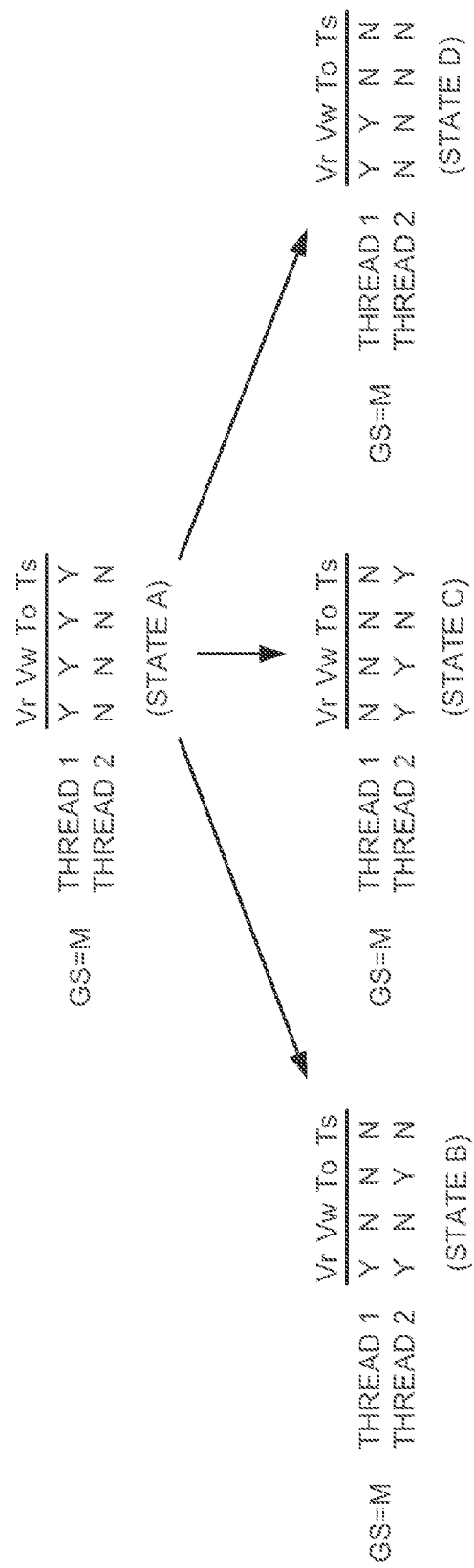
FIGS. 7 and 8 show examples of how thread state information may be used to control thread activity and rollback and commitment of transactions.

FIG. 7 shows various example transitions corresponding to steps in method 600. In many cases, it will be desirable to prevent any thread from observing data that has been speculatively written by another thread. This may be implemented via a rollback when such an attempt is made. The transitions from State A to State B and from State A to State C provide examples of such a rollback, and show a policy in which the microprocessor induces a rollback, if Ts=YES, before allowing any other thread to read from or write to the cache location. Again, rollback under these circumstances implements a policy in which no thread is able to read/observe a speculative write made by another thread.

In State A, Thread 1 has both read and write permissions to the cache location, and has both read from and written to the cache location—all bits are set to YES. The transition to State B is initiated by a request by Thread 2 to read the cache location. However, in State A, Thread 2 cannot read from the location, so the necessary read permission is secured (step 614 of FIG. 6). This also causes a rollback of Thread 1 (step 616) because Thread 1's Ts bit was set to YES. The rollback clears the To and Ts bits of Thread 1, as seen in State B. In State B, Thread 2 has also proceeded to actually perform the requested read, and its To bit has thus been set to YES. It should also be noted that Thread 1 has retained its read permission to the line, in accordance with a policy in which multiple threads can have read permission to the same location, provided that no thread has write permissions.

The transition to State C from State A is initiated as a result of a write request from Thread 2. This results in Thread 2 having exclusive access to the cache location (both Vr and Vw set to YES in State C). In State C, Thread 2 has also proceeded to perform the requested write operation, resulting in Ts being set to YES. And as in the prior example, the rollback of Thread 1 is reflected in the clearing of its To and Ts bits. In contrast to the prior example, Thread 1 retains no permissions due to the exclusivity obtained by Thread 2 (Thread 2 is essentially placed in an invalid state with respect to the cache location).

The example transition from State A to State D in FIG. 7 shows bit transitions that occur during commitment. As with rollback, when a thread's transaction commits, any To and Ts bits for that thread are cleared. In State D, Thread 1's transaction has committed.

As indicated in the above example invariants, it is legal for multiple threads to read from the same cache location, provided no thread has write access. Accordingly, if a thread has speculatively read a cache location (To=YES) but not speculatively written (Ts=NO), inducing rollback of the thread because of another thread's action depends on whether that action is a read request or a write request. In the case of a read request only, rollback is not required.

Figure 8:
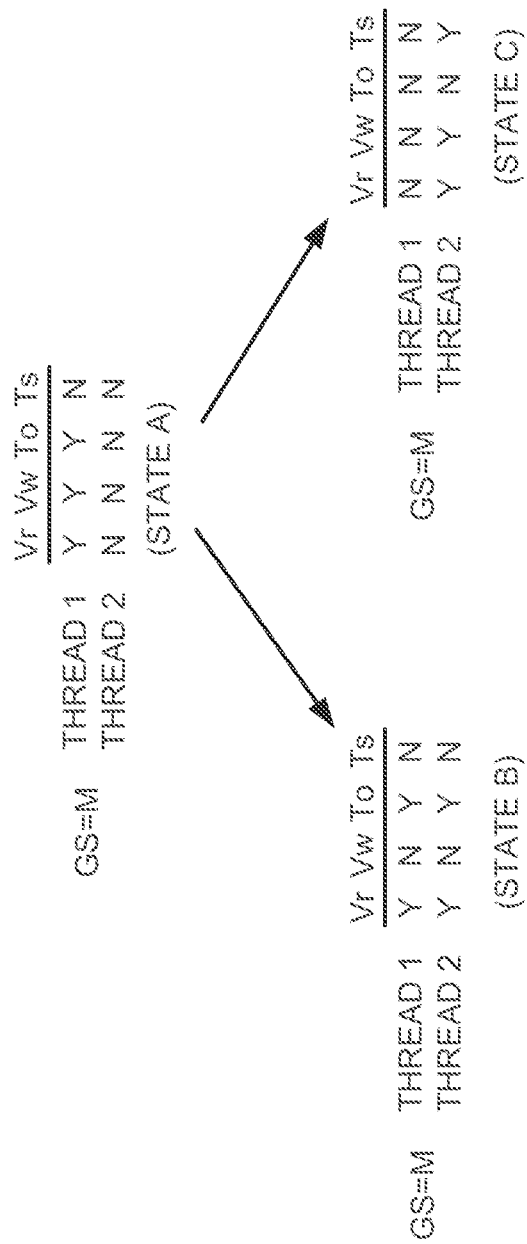

In FIG. 8, example transitions are shown which illustrate the above proposition. In State A, Thread 1 has read and write permissions (exclusive access to the cache location). Thread 1 further has read from the cache location, but has not speculatively written. The transition from State A to State B is prompted by a request from Thread 2 to read from the cache location. In State A, Thread 2 does not have read permission, so the request is treated essentially as a cache miss. To proceed with the read, state must be transitioned to give Thread 2 the necessary read permission (step 614 in FIG. 6). Since it is legal in the above example policy for more than one thread to read/observe a cache location, Thread 1 does not need to be rolled back, because it has not written to the location and Thread 2 is requesting read permission only. Note, however, that Thread 1's write permission is revoked, in accordance with the constraint that only one thread at a time can have exclusive write access to the cache location. In contrast, if Thread 2 requests write permission, thread 1 must be rolled back before allowing a write to the location (see the transition from State A to State C in FIG. 8). Note also in State C that in addition to securing the write permission, Thread 2 has proceeded to write to the location (Ts=YES).

It should be further understood from the above examples and state bit invariants, if To or Ts is set for a thread, that thread must be rolled back before allowing another thread to write to the cache location.

Although the examples of FIGS. 7 and 8 all show a modified global state, other global states are possible and the actions of individual threads can affect the global state. For example, starting from a global shared state, granting a thread write access would entail a state transition to exclusive. The actual performing of a write would result in a global state transition to modified. In addition, actions by other coherent agents or off-core threads can affect the global state and the thread state information. For example, a write snoop from another core, could cause a global state invalidation on a cache location and rollback of threads that has speculatively read from or written to the cache location. In the example of an off-core action affecting the cache location, the To and Ts indicators still provide efficient identification of threads/transactions that need to be rolled back as a result of the global state transition.

The above examples imply that indicating whether the threads have performed speculative write activity requires a Ts bit for each thread. However, since only one thread is permitted to write to the cache location, a single speculative bit for the cache location may be used. For purposes of identifying which thread has performed the speculative store, the cache controller can simply look for the thread that has write access, since only one thread is permitted to have write access in the above examples. Accordingly, the language herein that specifies that each thread has a write indicator Ts encompasses the situation in which that indicator is derived as a result of a two-step determination: (1) identification that the cache location has been speculatively written, and (2) identification of which thread has write access for the cache location.

In the above examples, read and write permissions are encoded with two bits, one for reading and one for writing. In another example, permissions may be encoded as exclusive, shared, or invalid. Exclusive thread permission corresponds to Vr=YES and Vw=YES in the above examples; shared thread permission corresponds to Vr=YES and Vw=NO; and invalid thread permission corresponds to Vr=NO and Vw=NO.

The example systems and methods describe above provide a number of advantages. Global state information is still provided for the cache location to identify how it is shared with other caches, e.g., caches outside the core but that are backed by a shared memory resource. The independent thread state information allows the control mechanisms to easily identify whether or not threads are allowed to perform transactional operations on a cache location. If permissions need to be upgraded to allow a transactional operation, the thread state information also enables the system to quickly identify what actions need to be taken to allow the operation to go forward.

Specifically, the system provides a mechanism for efficiently determining what a thread has done in relation to a cache location while performing a transaction. This information allows the control mechanisms to quickly identify if a thread needs to be rolled back to permit another thread to perform a requested action. If a thread has taken no actions (To=NO and Ts=NO), then there is no need for it to be rolled back when other threads seek various permissions. If one or both of To and Ts are set to YES, the need for rollback depends on what action is requested by another thread or another coherent agent outside the core.

The systems and methods described above are also applicable to implementations where a store buffer is provided in front of the data cache. In these implementations, "writing to the cache location" includes writing to a store-to-load forwarding buffer or other buffer in front of the cache. Accordingly, a thread's Ts bit may be set indicating a write to the cache location even where the store data is still sitting in a buffer in front of the cache and has not yet been retired.

Note that the method 600 may be implemented by any suitable cache controller or other control logic in a microprocessor without departing from the scope of the present disclosure. It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A multi-threaded microprocessor with a transactional memory system, comprising:
   a data cache backed by a shared memory resource, the data cache including a plurality of cache locations; and
   a cache controller operatively coupled with the data cache and which maintains and controls, for each of the cache locations,
   (i) a global state for the cache location specifying coherency of the cache location relative to the shared memory resource and to a cache location in another data cache backed by the shared memory resource, and
   (ii) thread state information associated with a plurality of threads that interact with the cache location, the thread state information being specified separately from and in addition to the global state, where the cache controller uses the thread state information to individually control whether each thread can read from and write to the cache location, and to control whether uncommitted transactions of threads relating to the cache location are to be rolled back.

2. The system of claim 1, where the cache controller is operative to ensure that if any one of the threads has permission to write to the cache location, then all of the other threads are prevented from reading from and writing to the cache location.

3. The system of claim 2, where the cache controller is operative to permit more than one of the threads to read from the cache location provided that none of the threads has permission to write to the cache location.

4. The system of claim 3 where the thread state information includes, for each of the threads, a read indicator Ts set to YES or NO to respectively identify whether or not an uncommitted transaction of the thread has speculatively read from the cache location, and a write indicator Ts set to YES or NO to respectively identify whether or not the uncommitted transaction has speculatively written to the cache location.

5. The system of claim 4, where if Ts is set to YES, the microprocessor induces a rollback of the uncommitted transaction before allowing any other thread to read from or write to the cache location.

6. The system of claim 4, where if To is set to YES and Ts is set to NO, the microprocessor induces a rollback of the uncommitted transaction before allowing another thread to write to the cache location, but does not induce a rollback before allowing another thread to only read from the cache location.

7. The system of claim 4, where if either To is set to YES or Ts is set to YES, the microprocessor induces a rollback of the uncommitted transaction before allowing another thread to write to the cache location.

8. The system of claim 4, where the cache controller transitions To and Ts, if set to Yes, to No upon either a rollback or commit of the uncommitted transaction.

9. The system of claim 4; where if the cache location contains dirty committed data prior to a first speculative store to the cache location performed by the uncommitted transaction, the microprocessor makes a backup copy of the dirty committed data, the backup copy being restored or exposed to the cache location in the event of rollback of the uncommitted transaction and invalidated in the event of commitment of the uncommitted transaction.

10. The system of claim 1, where the global state is a MESI state specifying whether the cache location is modified, exclusive, shared or invalid, and is maintained for the cache location independently of the thread state information.

11. A method of maintaining coherency of a cache location in a data cache, comprising:
   maintaining a global state for the cache location in the data cache, the global state specifying the coherence state of the cache location relative to a shared memory source and a cache location in another data cache backed by the shared memory resource;
   for each of a plurality of threads, maintaining read and write permissions for the thread for the cache location;
   tracking whether an uncommitted transaction of any of the threads has performed a speculative write to the cache location;
   for each of the plurality of threads, tracking whether an uncommitted transaction of the thread has performed a speculative read from the cache location; and
   in response to a request to read from or write to the cache location from one of the threads, determining whether granting that request requires rolling back any of the other threads, where such determination is made with reference to the tracking of speculative writes to and the tracking of the speculative reads from the cache location by any of those other threads.

12. The method of claim 11, where setting a global state for the cache location includes setting a MESI state for the cache location, specifying whether the cache location is modified, exclusive, shared or invalid.

13. The method of claim 11, where setting read and write permissions for the plurality of threads includes allowing only one of the threads at any given time to write to the cache location.

14. The method of claim 13, where setting read and write permission for the threads includes, in the case of one of the threads having speculatively written data to the cache location, preventing any of the other threads from reading that speculatively written data.

15. The method of claim "13, where setting read and write permissions for the threads includes allowing more than one of the threads at any given time to read from the cache location.

16. The method of claim 11, where granting a write request for the cache location for one of the threads requires a rollback of any other thread that has performed a speculative read from or a speculative write to the cache location.

17. The method of claim 11, where granting a read request for the cache location for one of the threads requires a rollback of any other thread that has performed a speculative write to the cache location, but does not require a rollback of any other thread that has speculatively read from the cache location but not speculatively written to the cache location.

18. A multi-threaded microprocessor with transactional memory, comprising:
   a data cache backed by a shared memory resource, the data cache including a plurality of cache locations; and
   a cache controller which maintains and controls, for each of the cache locations,
   (i) a global MESI state for the cache location specifying whether, relative to the shared memory source and a cache location in another data cache backed by the shared memory resource, the cache location is modified, exclusive, shared or invalid;
   (ii) identification of whether any of the plurality of threads has, in carrying out an uncommitted transaction, performed a speculative write to the cache location; and
   (iii) for each of the threads, identification of whether the thread has, in carrying out an uncommitted transaction, performed a speculative read from the cache location, and where the microprocessor, upon receiving a request from one of the threads to write to or read from the cache location, determines whether granting the request requires rollback of any other of the threads, such determination being made based on whether those other threads have speculatively written to or speculatively read from the cache location.

19. The system of claim 18, where the cache controller maintains and controls, for the cache location, read and write permissions for each of the threads, regardless of whether the global MESI state of the cache location is modified, exclusive, shared or invalid.

20. The system of claim 19, where the cache controller sets the read permissions so as to prevent, in the event that one thread has speculatively written data to the cache location, any of the other threads from reading that speculatively written data.

* * * * *